United States Patent Office 3,553,324
Patented Jan. 5, 1971

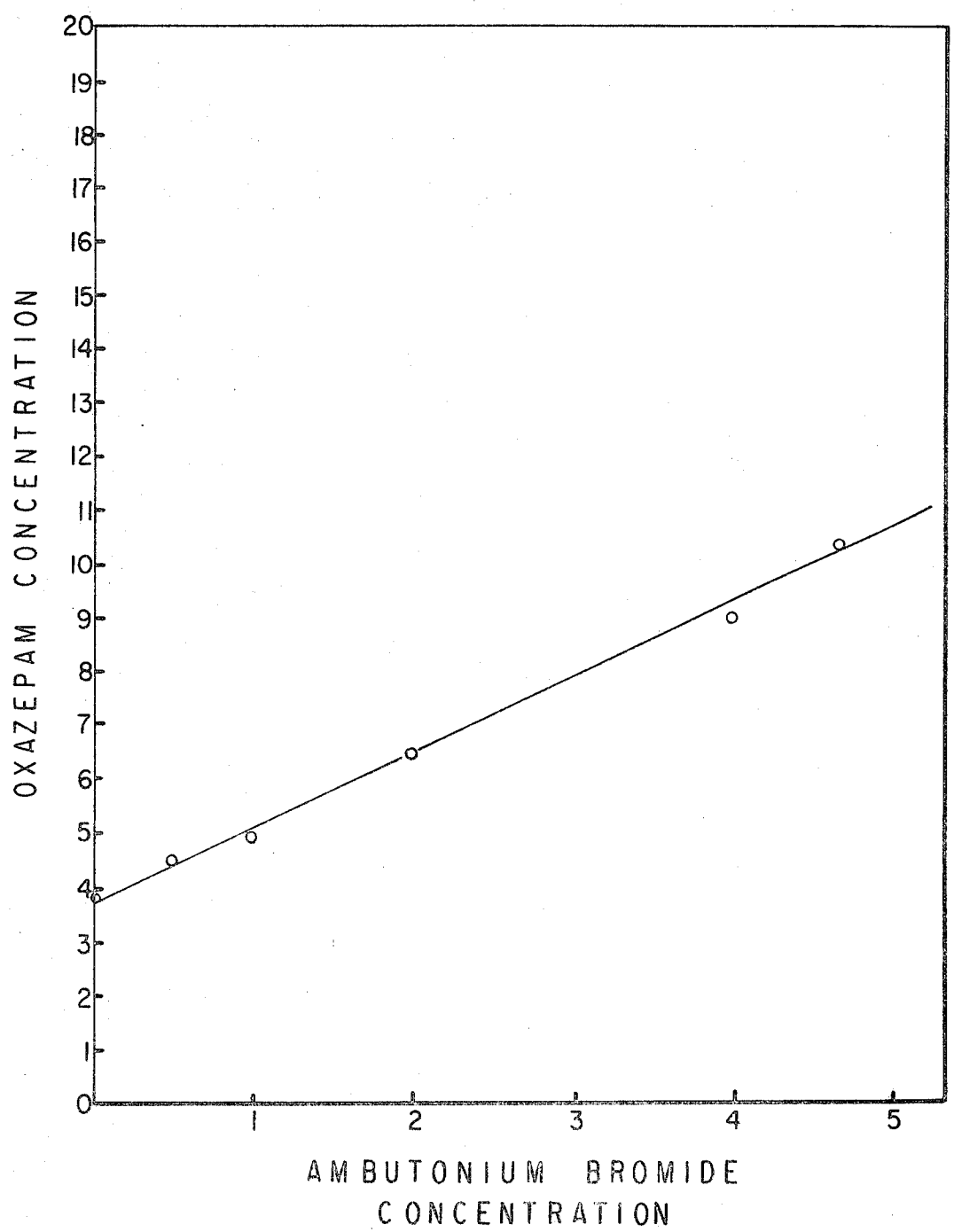

---

3,553,324
DISSOLUTION IMPROVING AMBUTONIUM OR PROTRIPTYLINE ADDITIVES IN CAPSULE AND TABLET DOSAGE FORMS OF A BENZODIAZEPINE, SUCH AS OXAZEPAM
John W. Poole, Norristown, Pa., assignor to American Home Products Corporation, New York, N.Y., a corporation of Delaware
Filed Sept. 25, 1968, Ser. No. 762,444
Int. Cl. A61k 27/10
U.S. Cl. 424—244               5 Claims

ABSTRACT OF THE DISCLOSURE

The disclosure is directed to a method of improving the dissolution of oxazepam from solid dosage forms by the addition of ambutonium bromide or protriptyline hydrochloride to oxazepam formulations.

---

This invention relates to a method of improving the dissolution of oxazepam by the incorporation of salts of nitrogen containing basic substances, particularly acidic salts of basic medicinal agents in formulations. More particularly, it relates to the incorporation of tertiary amines and quaternary amines, in formulations with oxazepam significantly to improve the in vitro availability of the oxazepam. Best results are obtained where the second member is present in a ratio of 1:10 to 10:1 based on the oxazepam content by weight. Especially advantageous results are obtained where the ratio is 6:1 to 1:1.

More particularly, it has been found the addition of ambutonium bromide or protriptyline hydrochloride significantly improves the in vitro availability of the oxazepam. Without wishing to be bound by a theory of operation, it is believed that a molecular complex is formed between the oxazepam and ambutonium bromide, or oxazepam and protriptyline hydrochloride. The formation of such a complex in the micro-environment of the dosage unit is a possible mechanism by which the in vitro availability of the oxazepam is improved in formulations of this type. An improved in vitro availability of the relatively insoluble oxazepam results in a more efficient biological utilization of the oxazepam.

The Merck Index, Eight Edition describes the foregoing compounds as follows. Oxazepam is 7-chloro-1, 3-dihydro-3-hydroxy-5-phenyl-2H-1,4-benzodiazepin-2-one and has the structural formula

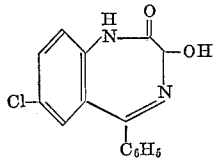

and ambutonium bromide is 3-(carbamoyl-3,3-diphenyl-propyl)ethyldimethylammonium bromide and has the structural formula

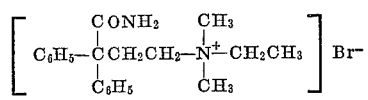

and protriptyline hydrochloride is N-methyl-5H-dibenzo [a,d]cycloheptene-5-propylamine and has the structural formula

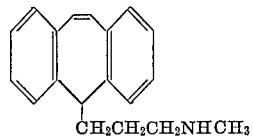

It is an object of the present invention to provide oxazepam-containing compositions of matter which have improved dissolution of oxazepam.

It is a further object of the present invention to provide compositions of oxazepam with ambutonium bromide or protriptyline hydrochloride which provide improved dissolution of the oxazepam content.

FIG. 2 shows the effect of ambutonium bromide concentration on the aqueous solubility of oxazepam.

Figure 1:
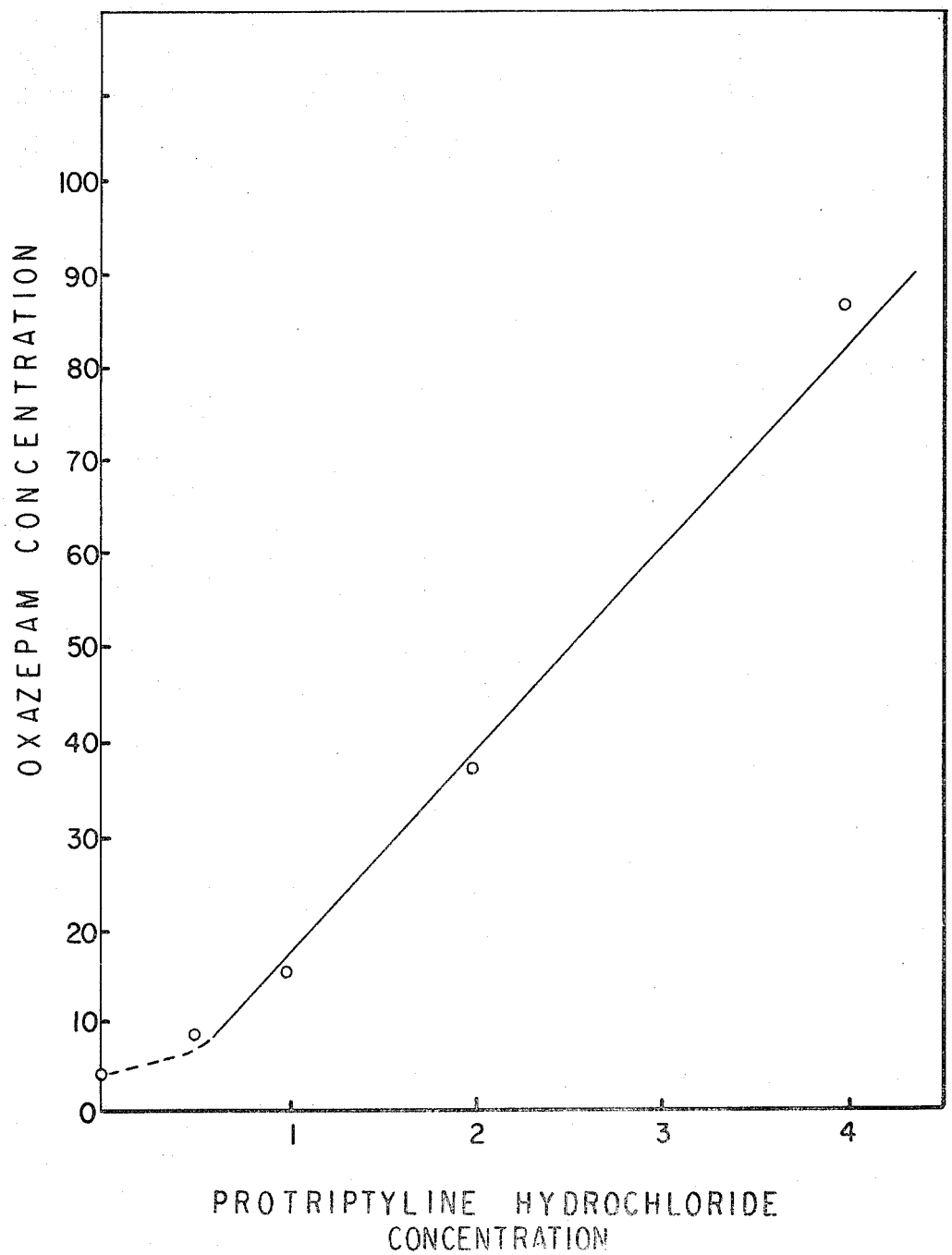
FIG. 1 shows the effect of protriptyline hydrochloride concentration on the aqueous solubility of oxazepam.

In FIG. 1 the abscissa is shown in percent of protriptyline hydrochloride in solution. The ordinate is the solution concentration of the oxazepam (present in excess) stated in mg. percent, which is the number of milligrams in solution in 100 cubic centimeters of final solution. As may be seen from FIG. 1 in the absence of protriptyline hydrochloride in the oxazepam solution concetration is about four mg. percent. The effect of addition of about one-half percent of protriptyline hydrochloride is shown to increase the oxazepam concentration to about eight mg. percent. The oxazepam solution concentration increases substantially linearly with an increase in protriptyline hydrochloride up to at least 4 percent protriptyline hydrochloride where the oxazepam concentration is about 85 mg. percent.

In FIG. 2 the abscissa is the concentration of ambutonium bromide in percent in solution. The ordinate is oxazepam (present in excess) solution concentration stated in mg. percent. As may be seen in FIG. 2, the concentration of oxazepam in the absence of ambutonium bromide is about four mg. percent and increases substantially linearly with an icrease in ambutonium bromide up to at least about 4.6 percent by weight ambutonium bromide at which point the concentration of oxazepam is about 10.2 mg. percent.

From an inspection of the figures it may be seen that the effect of both ambutonium bromide and protriptyline hydrochloride on the aqueous solubility of oxazepam is marked.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

This example demonstrates the effect of ambutonium bromide on the dissolution rate of oxazepam from capsule formulations.

Two oxazepam compositions for use in capsules were prepared from the following ingredients.

|  | Formula I, mg./capsule | Formula II, mg./capsule |
|---|---|---|
| Oxazepam | 10.0 | 10.0 |
| Ambutonium bromide | None | 10.0 |
| Magnesium stearate | 2.2 | 2.2 |
| Lactose U.S.P. (inert filler) | 207.8 | 197.8 |
| Total | 220.0 | 220.0 |

All of the ingredients were mixed in a small Hobart mixed for 10 minutes and then passed through a Fitzpatrick Model D mill utilizing a No. 30 U.S. Standard screen. The screened porduct was remixed for ten minutes, encapsulated in No. 4 hard gelatin capsules and polished.

The magnesium stearate was used as a lubricant.

A test medium made up of distilled water, was placed in a 2 liter dissolution vessel and heated to a temperature of 37° C. The capsules of Formula I were added, and agitation with a Teflon paddle at the rate of 50 revolutions per minute was commenced. Samples were withdrawn through a filter at 5 minute intervals for one hour and analyzed spectrophotometrically for dissolved oxazepam. The perecent by weight of oxazepam that was in solution at the end of 30 minutes and at the end of 60 minutes was also noted. The test was discontinued after 60 minutes.

The same procedure was repeated with capsules of Formula II. The results are shown below in Table 1.

TABLE 1

[Effect of ambutonium bromide on dissolution of oxazepam capsules]

|  | Percent in solution at— | |
|---|---|---|
|  | 30 minutes | 60 minutes |
| Formula I | 7.5 | 15 |
| Formula II | 19 | 26 |

The results show that the dissolution of oxazepam from capsules containing ambutonium bromide made from Formula II is significantly faster than from capsules made from Formula I without ambutonium bromide.

EXAMPLE II

This example demonstrates the effect of protriptyline hydrochloride on the dissolution of oxazepam from capsule formulations.

The procedure of Example I was repeated using, successively, the following capsule compositions.

|  | Formula (per capsule) | |
|---|---|---|
|  | I, mg. | II, mg. |
| Oxazepam | 10.0 | 10.0 |
| Protriptyline hydrochloride | None | 10.0 |
| Magnesium stearate U.S.P. | 6.6 | 6.6 |
| Lactose | 203.4 | 193.4 |

The results of the test are shown in Table 2.

TABLE 2

[Effect of protriptyline hydrochloride on dissolution of oxazepam capsules]

|  | Percent in solution at— | |
|---|---|---|
|  | 30 minutes | 60 minutes |
| Formula I | 4 | 12 |
| Formula II | 36 | 47 |

Table 2 shows that the addition of protriptyline hydrochloride improves the dissolution of oxazepam.

EXAMPLE III

This example demonstrates the effect of protriptyline hydrochloride on the dissolution rate of oxazepam from tablet formulations.

Two batches of tablets were prepared from the following ingredients stated in milligrams:

|  | Batch A | Batch B |
|---|---|---|
| Part A: |  |  |
| Oxazepam | 10.00 | 10.00 |
| Protriptyline hydrochloride | 10.00 | None |
| Solka-Floc Dev. 2030 | 11.00 | 11.00 |
| Corn Starch U.S.P. (as 10% paste) | 4.00 | 4.00 |
| Lactose U.S.P. | 9.00 | 9.00 |
| Calcium phosphate, dibasic U.S.P. dihydrate | 133.00 | 143.00 |
| Part B: |  |  |
| Guar gum | 6.10 | 6.10 |
| Magnesium stearate | 0.90 | 0.90 |

Part A (except starch) of each of the batches was mixed, comminuted, remixed and granulated with the starch paste, milled, dried and remilled. Part B was added through a number 40 screen, mixed and compressed into tablets.

The test medium and dissolution procedure of Example I were followed with each batch. The results are shown in Table 3.

TABLE 3

[Effect of protriptyline hydrochloride on dissolution of oxazepam tablets]

|  | Percent in solution at— | |
|---|---|---|
|  | 30 minutes | 60 minutes |
| Batch A | 28 | 48 |
| Batch B | 11 | 27 |

The results show that the addition of protriptyline hydrochloride has a substantial effect on the dissolution of oxazepam in such tablet formulations.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A composition of matter containing oxazepam in which the oxazepam has a high dissolution rate in capsule and tablet form, comprising oxazepam and a second member selected from the class consisting of ambutonium bromide and protriptyline hydrochloride.

2. A composition as defined in claim 1 in which the ratio of the second member to oxazepam may be from 1:10 to 10:1.

3. A composition of matter as described in claim 1 in which the second member is ambutonium bromide.

4. A composition of matter as described in claim 1 in which the second member is protriptyline hydrochloride.

5. A composition of matter containing a benzodiazepine in which the benzodiazepine has a high dissolution rate in capsule and tablet form, comprising a benzodiazepine and a second member selected from the class consisting of ambutonium and protriptyline and the pharmaceutically acceptable acid addition salts thereof.

References Cited

UNITED STATES PATENTS

| 3,116,203 | 12/1963 | Kariss et al. | 424—244 |
| 3,228,834 | 1/1966 | Gans et al. | 424—244X |
| 3,336,196 | 8/1967 | McGregor | 424—329X |
| 3,341,414 | 9/1967 | Cherkas et al. | 424—329X |
| 3,344,030 | 9/1967 | Stevens et al. | 424—244 |

SHEP K. ROSE, Primary Examiner

U.S. Cl. X.R.

424—329